March 22, 1955

A. VAN RYAN 2,704,841

COMBINED CURRENT RESPONSIVE AND TEMPERATURE
RESPONSIVE ALARM DEVICE FOR TRANSFORMERS

Filed Jan. 8, 1951

ANTHONY VAN RYAN
INVENTOR

BY Charles A. ——
ATTORNEY

United States Patent Office 2,704,841
Patented Mar. 22, 1955

2,704,841

COMBINED CURRENT RESPONSIVE AND TEMPERATURE RESPONSIVE ALARM DEVICE FOR TRANSFORMERS

Anthony Van Ryan, South Milwaukee, Wis., assignor to McGraw Electric Company, Milwaukee, Wis., a corporation of Delaware Application January 8, 1951, Serial No. 205,009

3 Claims. (Cl. 340—253)

This invention relates to electric induction apparatus, and particularly to means for indicating existing overload and excessive temperature conditions effecting the apparatus.

Internal losses of an induction apparatus such as transformer increases as the load increases. If the transformer becomes overloaded beyond a predetermined value, the internal temperatures may also rise beyond a safe operating value with resulting damage to the transformer and insulation. The maximum safe load of a transformer varies with the rate at which this internal heat can be dissipated. Thus, when external temperatures surrounding the transformer are comparatively cooler than the transformer oil, the heat will be more rapidly dissipated. Warning devices for independently indicating either overload conditions or excessive oil temperature conditions are of little value under decreasing load conditions, or under conditions of rapid internal heat dissipating which tend to compensate for the deleterious action of overload currents.

The general object of the present invention is to provide an improved protective indicating device for electric induction apparatus which is responsive to both overload current and to oil temperatures, and which is self-compensating for varying load and oil temperature conditions.

It is a further object of this invention to provide an indicating device for electric induction apparatus responsive to load current and oil temperatures, and which will either operate when one leg portion of the secondary winding is carrying most or all of the load, or when there is a balanced load distribution across the legs of the secondary winding.

Figure 1:
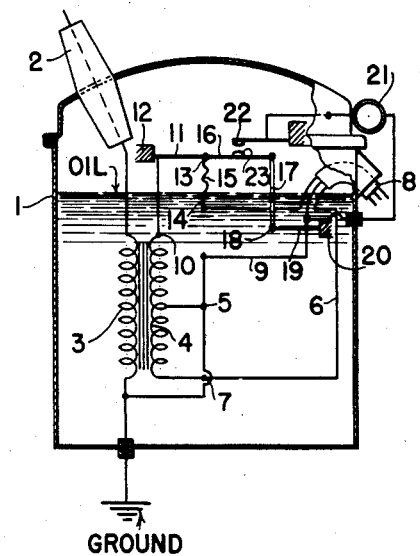
Fig. 1 is a diagrammatic view of an oil immersed transformer incorporating the novel indicating device, which device cooperates with a single current responsive element in series connection with the entire length of the transformer secondary winding.

Referring to Fig. 1, 1 represents an oil-filled transformer tank. The particular transformer diagrammed is of the type utilizing a single primary bushing 2, the other primary lead being connected with ground. However, it will be apparent that the novel device will operate with equal effectiveness in any oil-filled transformer. The primary winding is indicated generally by the reference character 3.

The following description will be made with reference to both Figs. 1 and 2, and is directed to a single, current responsive element combined with a temperature responsive element. This combination is particularly useful for transformers having a balanced load distribution, and may be used where the load is drawn from the entire winding length. The secondary winding 4 is divided, as shown, into two portions, the center tap 5 of which is electrically connected to ground through the primary winding 3. The lead 6 from the load tap 7 is arranged for electrical connection directly with load through a conventional secondary bushing 8. The neutral or ground lead 9 is electrically connected to the tap 5 and passed through the secondary bushing 8. It is to be noted that although the secondary leads are shown in the diagram as passing through a single bushing 8, it will be obvious that individual bushings may be provided for each secondary lead.

An end tap 10 of the secondary winding 4 is connected in series with a current responsive element, which may be in the form of a bimetallic actuating strip 11. This strip is securely supported at one end, as diagrammed at 12. The opposite end 13 of the bimetallic element is electrically connected to the load lead 14, preferably through a flexible conductor 15. The flexible conductor 15 permits the end 13 of the bimetallic element 11 to flex either upwardly or downwardly without restriction.

The bimetallic element, as shown here, is responsive to load current conditions because of its inherent ohmic resistance. Load current in excess of a predetermined value will cause the end 13 to rise as shown in dot-dash lines in Fig. 2. The end 13 is hingedly fastened to a conducting strip 16, which will hereinafter be referred to as a "differential bridge." The opposite end of the differential bridge is hingedly fastened to an insulated link 17, which is in turn hingedly fastened to the deflecting end 18 of an oil temperature responsive element 19. The element 19 is preferably a bimetallic strip securely supported as diagrammed at 20. As shown in dot-dash lines in Fig. 2, the end 18 is preferably deflected upwardly by increased oil temperature. The bimetallic element 19 is preferably positioned proximate to the upper oil level where it may more sensitively respond to temperature variations. It is to be noted that the bimetallic element 19 is purely temperature responsive and is in no way electrically connected to the transformer windings.

An indicating device, generally indicated by reference character 21, is positioned exteriorly of the tank 1. This device may be in the form of a light, an audible device, or any other suitable means. The indicating device 21 is electrically connected to the neutral or grounded secondary lead 9. The other electrical connection is made with a stationary contact 22, which is positioned to cooperate with a contact 23 mounted on the conducting differential bridge 16. It is to be noted that only the portion of the bridge connecting the contact 23 and the linkage end 13 need be electrically conducting for purposes of this invention.

The embodiment specifically shown in Figs. 1 and 2 operates as follows: Considering overload conditions independently of temperature variations for the moment, should the load current in the secondary 4 increase above a predetermined value, the current responsive bimetallic actuator strip 11 will be heated because of its ohmic resistance. This will cause the free end 13 of the element to deflect upwardly, as shown by the dot-dash lines of Fig. 2. This upward deflection will cause the contact 23, carried by the conducting differential bridge 16 to be electrically engaged with the stationary contact 22. The circuit to the indicating device 21 will now be completed with the device giving warning of such overload condition.

Should the oil temperature rise independent of any overload conditions, the device will function as follows: Oil temperatures above a predetermined value will cause the free end 18 of the temperature responsive element 19 to deflect upwardly. This deflection will be translated to the insulated link 17 which, in turn, actuates the differential bridge 16 to cause the contact 23 positioned thereon to electrically engage the contact 22. The electrical circuit to the indicating device 21 will be completed through the flexible conductor 15 to lead 14 and through the neutral lead 9. Accordingly, the indicating device 21 will give warning of the excessive temperature condition.

Under certain temperature conditions, it may not be harmful to the transformer to carry an overload temporarily. Also, an excessive oil temperature may not endanger the transformer if the current which produced this temperature is decreasing in value. These conditions bring to light the particular novelty of the cooperating elements 11 and 19 acting in combination. With reference to Fig. 2, it will be apparent that should an overload condition develop under conditions where the oil temperature remains relatively low, the indicating device 21 will respond accordingly. It is well known that the various parts of the transformer will withstand greater load current conditions at lower oil temperatures. At the same time, a relatively higher oil temperature may not endanger the transformer if the current which produced the temperature is decreasing. It will be obvious that when the oil temperature is relatively low, the free end 18 of the temperature responsive element 19 will be deflected downwardly, as shown in dot-dash lines in Fig. 2, and accordingly move the contact 23, mounted on the differential bridge 16, in a downward direction relative to the stationary contact 22 by means of the insulating link 17. As the contacts 22 and 23 are now positioned relatively farther apart, it will take a greater current to cause the free end 13 of the current responsive element 11 to rise and permit electrical engagement of the contacts 22 and 23 for operating the indicating device.

Where oil temperature is relatively high and load current is relatively low or decreasing, the device functions as follows: The free end 18 of the oil temperature responsive element 19 will be deflected upwardly; but since the load current is relatively low, or decreasing, the contact 23 will be forced downwardly relative to stationary contact 22 by the free end 13 of the current responsive element 11. Accordingly, the indicating device will not be operated until a relatively greater oil temperature or load current is reached.

Figure 3:
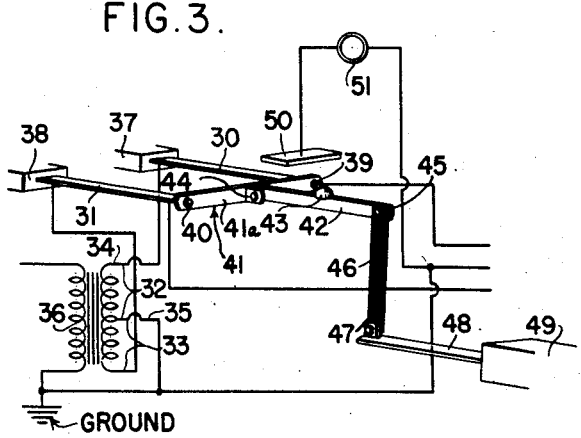
Fig. 3 is a perspective view, partly in diagram, illustrating another embodiment of the novel indicating device, which device responds to load conditions in selected portions of the transformer secondary winding.

When one leg of the secondary is carrying most or all of the load, its current value may be considerably greater than the full load current value for the same temperature rise. This overload condition is indicated by providing a modified form of the novel device as shown in Figure 3. The modified form of this invention incorporates the use of two current responsive bimetallic elements 30 and 31, each respectively electrically connected to a leg portion 32 and 33 of the secondary winding 34 which has its center tap 35 connected with ground or neutral. The primary is designated by the reference character 36. The current responsive bimetallic elements 30 and 31 are rigidly supported at one end, designated generally at 37 and 38 respectively.

The free ends 39 and 40 of bimetallic elements 30 and 31, respectively, move in an upward direction responsive to increased load current conditions because of the inherent ohmic resistance of the elements 30 and 31. Independent response of either of the elements 30 and 31 is provided by pivotally interlinking the free ends 39 and 40 with a coupling strip 41. The strip 41 is coupled to a differential bridge 42, which is substantially identical to the bridge 16 disclosed in Fig. 2. A contact 43 mounted on the bridge 42 may be electrically connected through a conducting leg portion 41a of the coupling strip 41 to either of the secondary winding portions 32 or 33, and shown here connected to portion 33. It will be apparent that any suitable conducting means, such as a flexible lead (not shown), may be used to electrically connect the contact 43 with either of the portions 32 or 33. It will be obvious that the secondary winding portions 32 and 33 must be insulated from one another, but that either, alone, may be used to supply electrical power to the indicating device as will be hereinafter described.

The opposite end 45 of the differential bridge 42 is pivotally connected to an insulating link 46 substantially normally perpendicular thereto. The opposite end 47 of link 46 is pivotally connected to an oil temperature responsive bimetallic element 48 which is rigidly supported as diagrammed at 49 in Fig. 3. The cooperating stationary contact 50 is positioned above the bridge contact 43. The stationary contact is electrically connected to the warning device 51, which may be connected with ground as shown to provide a complete electrical circuit on engagement of the contacts 43 and 50.

Figure 2:
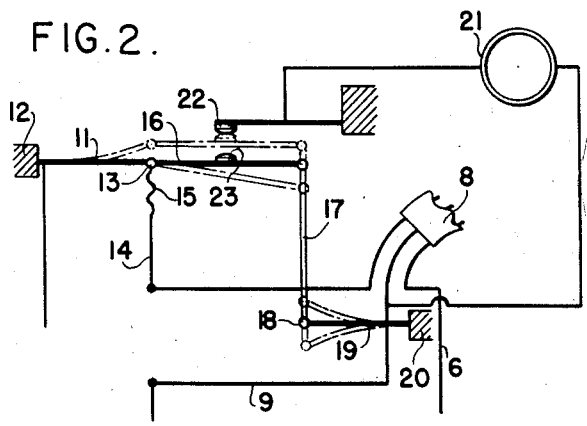
Fig. 2 is an enlarged diagrammatic view of a portion of Fig. 1.

This embodiment operates substantially the same as that disclosed in Figs. 1 and 2. However, in this case there is presented the additional feature of differentially coupling the bridge 42 with the bimetallic elements 30 and 31. When either of the leg portions of the secondary is carrying most or all of the load, its current value may be considerably greater than the full load current value for the same temperature rise. Thus, the contact 43 positioned on the differential bridge 42 will be brought into electrical engagement with the stationary contact 50 should an overload condition exist in either one of the secondary winding portions 32 or 33. The electrical circuit through the warning device 51 will be completed through the portion 33 of the secondary 34 as shown in Fig. 3.

Again, as disclosed in Figs. 1 and 2, should the transformer oil temperature be relatively cool, the contacts 43 and 50 will be brought farther apart by the action of the temperature responsive element 48. However, should the temperature rise while the load current in either or both of the leg portions 32 or 33 is at a relatively low or decreasing value, the contacts 43 and 50 will be positioned farther apart to compensate for this temperature condition.

It will be obvious that any of well-known contact devices, such as toggle arrangements (not shown), may be provided for either of the described embodiments if so desired. The utility of such devices lies in the continuous operation of the indicating device once the contacts have become electrically engaged, thereby giving warning of momentary as well as permanent overload or excessive temperature conditions. It will also be apparent that a counting device (not shown) may be used in conjunction with the contacts for indicating the number of momentary engagements of the contacts.

It is also within the scope of this invention to incorporate the novel alarm device with a dry type induction apparatus. The thermal element may easily be adapted to respond to, and compensate for, excessive temperature conditions effecting the apparatus either exteriorly or interiorly thereof.

It will be apparent that a novel alarm device for indicating overload and excessive temperature conditions in an electric induction apparatus has been provided, which device is self-compensating for overload conditions in a relatively cool atmosphere, and conditions of relatively high apparatus temperatures with load current at a relatively low or decreasing value.

I claim:

1. In a liquid immersed electric induction apparatus including a load winding having a plurality of load portions and an alarm device including an electrically operated indicator, the combination of current responsive elements each individually electrically connected with one of said load winding portions and each responsive to predetermined load conditions effecting the respective portion connected therewith, and a thermal element responsive only to liquid temperature variations, each of said current responsive elements coacting independently with said thermal element to jointly modify the action of one another, and each of said current responsive elements and said thermal element jointly modifying the action of one another and independently controlling said alarm device responsive to predetermined load and liquid temperature conditions in said apparatus.

2. In a liquid immersed electrical induction apparatus including a load winding having a plurality of load portions and an alarm device including an electrically operated indicator, the combination of current responsive bimetallic elements each individually electrically connected with one of said load winding portions and each responsive to predetermined load conditions effecting the respective portion connected therewith, and a bimetallic thermal element responsive only to liquid temperature variations, each of said current responsive bimetallic elements independently coacting with said thermal bimetallic element to jointly modify the action of one another, and each of said current responsive bimetallic elements and said thermal bimetallic element jointly modifying the action of one another and independently controlling said alarm device responsive to predetermined load and liquid temperature conditions in said apparatus.

3. In a liquid immersed electrical induction apparatus including a load winding having a plurality of load portions and an alarm device including an electrically operated indicator, the combination of current responsive bimetallic elements each individually electrically connected with one of said load winding portions and insulating interlinked one with the other, said current responsive elements each responsive to predetermined load conditions effecting the respective portion connected therewith, a bimetallic thermal element responsive to liquid temperatures and insulatingly interconnected with said current responsive bimetallic elements, and spaced contact members for electrically operating said alarm device and normally in an electrical disengagement, each of said current responsive elements independently coacting with said thermal element to jointly modify the action of one another, and each of said current responsive elements and said thermal element jointly arranged to independently actuate said contact members responsive to predetermined load and liquid temperature conditions in said apparatus.

References Cited in the file of this patent

UNITED STATES PATENTS

| | | | |
|---|---|---|---|
| 1,738,651 | Huggins | Dec. 10, | 1929 |
| 2,053,944 | Cooney | Sept. 8, | 1936 |
| 2,351,408 | DeBeaumont | June 13, | 1944 |
| 2,351,983 | Leonard | June 20, | 1944 |
| 2,454,288 | Michaelson | Nov. 23, | 1948 |